(12) United States Patent
Nguyen et al.

(10) Patent No.: US 8,044,536 B2
(45) Date of Patent: Oct. 25, 2011

(54) POWERING DEVICES HAVING LOW AND HIGH VOLTAGE CIRCUITS

(75) Inventors: Man Van Nguyen, Fridley, MN (US); Shai Moshe Vaingast, Ganei Tikva (IL)

(73) Assignee: AMS Research Corporation, Minnetonka, MN (US)

( * ) Notice: Subject to any disclaimer, the term of this patent is extended or adjusted under 35 U.S.C. 154(b) by 301 days.

(21) Appl. No.: 12/249,019

(22) Filed: Oct. 10, 2008

(65) Prior Publication Data

US 2009/0096288 A1 Apr. 16, 2009

Related U.S. Application Data

(60) Provisional application No. 60/978,921, filed on Oct. 10, 2007.

(51) Int. Cl.
*H02J 3/14* (2006.01)
*H04B 15/00* (2006.01)

(52) U.S. Cl. .......................................... 307/82; 307/32

(58) Field of Classification Search .................... 307/31, 307/82
See application file for complete search history.

(56) References Cited

U.S. PATENT DOCUMENTS

| | | | |
|---|---|---|---|
| 4,355,277 A | 10/1982 | Davis et al. | |
| 4,365,290 A | 12/1982 | Nelms et al. | |
| 4,408,607 A | 10/1983 | Maurer | |
| 4,599,523 A | 7/1986 | Pless et al. | |
| 4,680,517 A | 7/1987 | Fujioka | |
| 4,782,280 A | 11/1988 | Lommers | |
| 5,373,195 A | 12/1994 | De Doncker et al. | |
| 5,412,308 A | 5/1995 | Brown | |
| 5,523,940 A | 6/1996 | Wymelenberg | |
| 5,528,087 A | 6/1996 | Sibata et al. | |
| 5,591,212 A | 1/1997 | Keimel | |
| 5,726,869 A | 3/1998 | Yamashita et al. | |
| 5,757,167 A | 5/1998 | Arora et al. | |
| 5,807,397 A | 9/1998 | Barreras | |
| 5,914,542 A | 6/1999 | Weimer et al. | |
| 6,061,577 A | 5/2000 | Andrieu et al. | |
| 6,093,982 A * | 7/2000 | Kroll | 307/115 |
| 6,144,192 A | 11/2000 | Suzuki | |
| 6,249,703 B1 | 6/2001 | Stanton et al. | |
| 6,269,011 B1 | 7/2001 | Ohshima | |
| 6,421,262 B1 | 7/2002 | Saxelby et al. | |
| 6,595,756 B2 | 7/2003 | Gray et al. | |
| RE38,777 E | 8/2005 | Adams et al. | |
| 7,064,529 B2 | 6/2006 | Telecco | |
| 7,122,026 B2 | 10/2006 | Rogers et al. | |
| 7,586,212 B2 * | 9/2009 | Morita et al. | 307/82 |
| 7,629,712 B2 * | 12/2009 | Nakashima et al. | 307/126 |
| 7,692,330 B2 * | 4/2010 | Takada et al. | 307/45 |
| 2004/0175598 A1 * | 9/2004 | Bliven et al. | 429/12 |
| 2005/0269883 A1 * | 12/2005 | Drader et al. | 307/131 |
| 2006/0149345 A1 | 7/2006 | Boggs, II et al. | |
| 2006/0173507 A1 | 8/2006 | Mrva et al. | |

* cited by examiner

*Primary Examiner* — Michael Rutland Wallis
(74) *Attorney, Agent, or Firm* — Westman, Champlin & Kelly, P.A.

(57) ABSTRACT

Embodiments of the invention are directed to a device that includes a battery having an output of a battery voltage, a step-up voltage converter, a high voltage circuit, a low voltage circuit and a controller. The step-up voltage converter includes an input that is coupled to the battery voltage. The step-up voltage converter is configured to produce a high supply voltage at an output. The high voltage circuit is coupled to the output of the step-up voltage converter. The controller selectively powers the low voltage circuit using either the output from the step-up voltage converter or the battery voltage.

18 Claims, 6 Drawing Sheets

POWERING DEVICES HAVING LOW AND HIGH VOLTAGE CIRCUITS

CROSS-REFERENCE TO RELATED APPLICATION

The present application is based on and claims the benefit of U.S. provisional patent application Ser. No. 60/978,921, filed Oct. 10, 2007, the content of which is hereby incorporated by reference in its entirety.

FIELD OF THE INVENTION

The present invention generally relates to battery powered devices that include high power circuitry demanding high power and low power circuitry demanding relatively lower power and, more particularly, to methods and circuits for supplying the high and low power to the high and low power circuitry.

BACKGROUND

Figure 1:
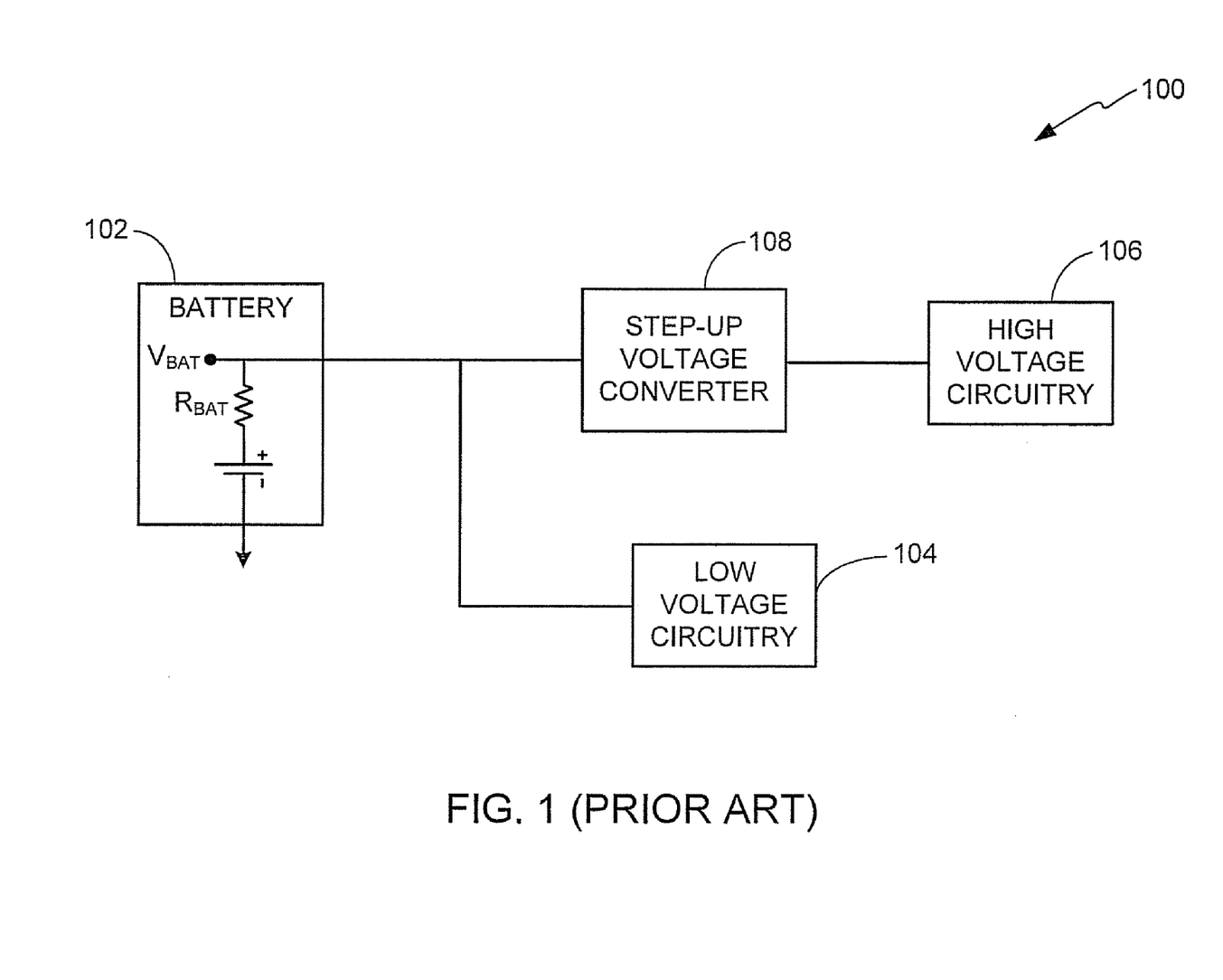
FIG. 1 is a schematic circuit diagram of a battery powered device having low voltage and high voltage circuits in accordance with the prior art.

Many battery powered, portable external devices and implantable medical devices are known, such as device 100 illustrated in the schematic circuit diagram of FIG. 1, that incorporate a single battery (or bank of batteries) 102 that provide power to low voltage circuitry 104 and high voltage circuitry 106. The low voltage circuit 104 represents components or devices that require a relatively lower power and lower operating voltage to operate properly than the components or devices represented by the high voltage circuit 106. The low operating voltage is typically lower than the output or terminal voltage $V_{BAT}$ of the battery 102. The components and devices represented by the high voltage circuit 106 typically require a high operating voltage, which is typically greater than the battery voltage $V_{BAT}$. The high voltage circuit 106 also generally draws a higher current during operations than the low voltage circuit 104.

The high voltage circuit 106 is periodically powered by a high voltage power supply circuit or step-up (boost) voltage converter 108 that draws current from the battery 102 and generates the voltage ($V_H$) demanded by the components or devices of the high voltage circuit 106 to operate properly. The relatively high current draw of the high voltage circuit 106 causes $V_{BAT}$ to drop due to the internal resistance $R_{BAT}$ of the battery 102. This drop in the available battery voltage $V_{BAT}$ can prevent the low voltage circuit from receiving the low operating voltage that is required by the low voltage circuit 104 to operate properly.

SUMMARY

One embodiment of the invention is directed to a device that includes a battery having an output of a battery voltage, a step-up voltage converter, a high voltage circuit, a low voltage circuit and a controller. The step-up voltage converter includes an input that is coupled to the battery voltage. The step-up voltage converter is configured to produce a high supply voltage at an output. The high voltage circuit is coupled to the output of the step-up voltage converter. The controller selectively powers the low voltage circuit using either the output from the step-up voltage converter or the battery voltage.

Another embodiment of the invention is directed to a device that includes a battery having an output of a battery voltage, a high voltage circuit powered by a high voltage holding capacitor, a step-up voltage converter, a low voltage holding capacitor and a low voltage circuit powered by the low voltage holding capacitor. The step-up voltage converter includes an input that is coupled to the battery voltage. The step-up voltage converter has an activated state, in which the step-up voltage converter charges the high voltage holding capacitor. The low voltage holding capacitor is powered by the battery voltage when the battery voltage exceeds a threshold value, and the low voltage holding capacitor is powered by the voltage on the high voltage holding capacitor when the battery voltage drops below the threshold value during charging of the high voltage holding capacitor by the step-up voltage converter.

Yet another embodiment of the invention is directed to a method of operating a device that is powered by a battery, which produces a battery voltage. The device includes a low voltage circuit that is powered by a low voltage holding capacitor and a high voltage circuit that is powered by a high voltage holding capacitor. In the method, the high voltage holding capacitor is charged using the battery voltage. The low voltage holding capacitor is charged using the battery voltage when the battery voltage exceeds a threshold value. The low voltage holding capacitor is charged using the voltage on the high voltage holding capacitor when the battery voltage falls below the threshold value.

This summary has been presented here simply to point out some of the ways that the invention(s) disclosed herein overcome difficulties presented in the prior art and to distinguish the invention(s) from the prior art and is not intended to operate in any manner as a limitation on the interpretation of claims that are presented initially in the patent application and that are ultimately granted.

BRIEF DESCRIPTION OF THE DRAWINGS

These and other advantages and features of the present invention will be more readily understood from the following detailed description of the preferred embodiments thereof, when considered in conjunction with the drawings, in which like reference numerals indicate identical structures throughout the several views, and wherein.

DETAILED DESCRIPTION OF ILLUSTRATIVE EMBODIMENTS

In the following description, references are made to illustrative embodiments of methods and apparatus for carrying out the invention. It is understood that the described embodiments represent only a sampling of the possibly numerous alternative circuit designs that could be utilized to practice the invention. Accordingly, it is understood that modifications can be made to the exemplary circuit designs and method steps described herein without departing from the scope of the invention.

Figure 2:
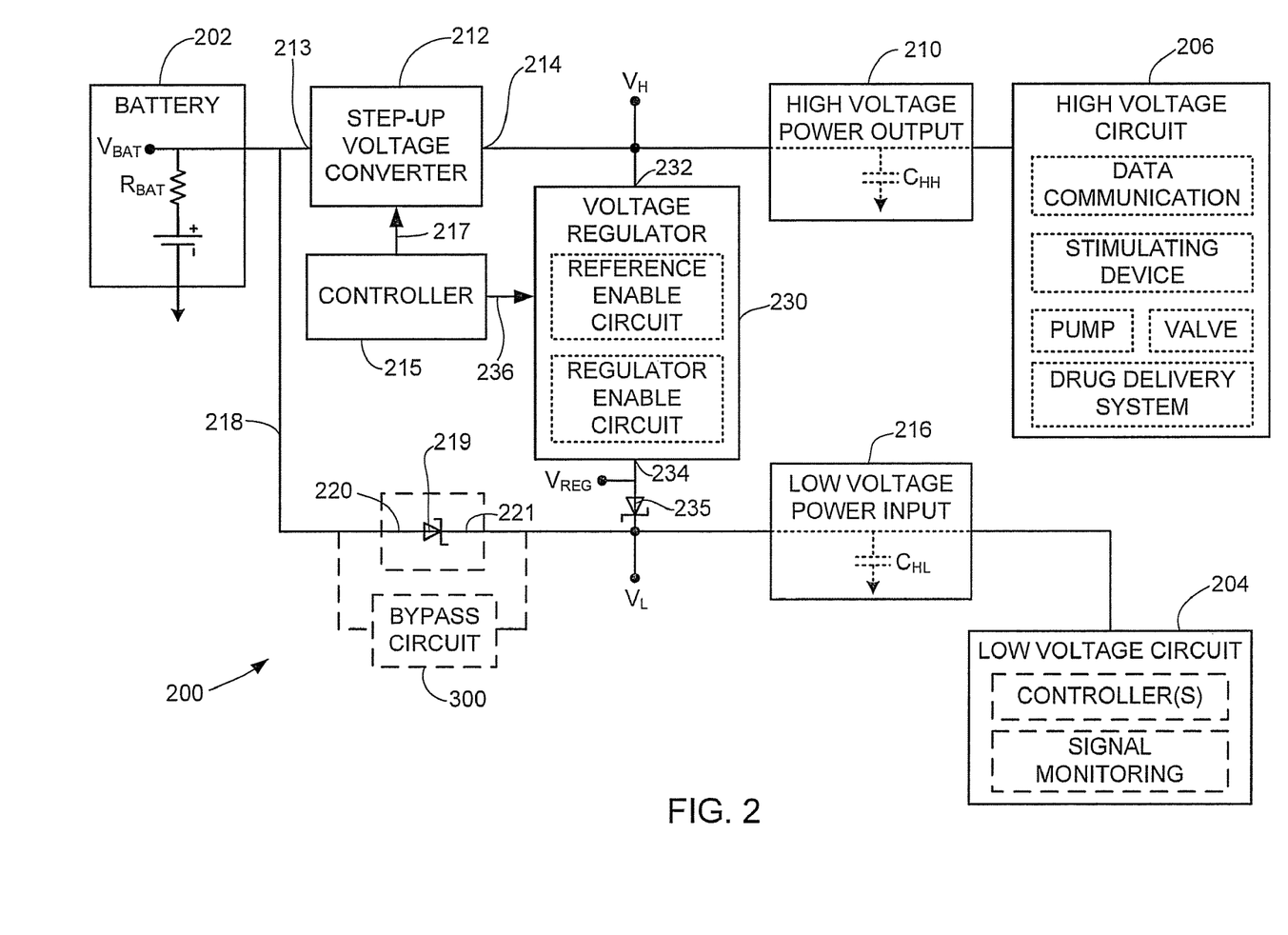
FIG. 2 is a schematic circuit diagram of a battery powered device having low voltage and high voltage circuits and a power circuit in accordance with embodiments of the invention.

Embodiments of the invention are generally directed to a device 200, illustrated in the schematic circuit diagram of FIG. 2, that includes low and high power supply circuits that utilize a depleatable battery 202 to respectively provide power to a low voltage circuit 204 and a high voltage circuit 206, as device 200 illustrated in the schematic circuit diagram of FIG. 2. The battery 202 produces a terminal output voltage $V_{BAT}$. The low voltage circuit 204 and the high voltage circuit 206 generally represent conventional circuitry, components and/or devices that receive a low operating voltage $V_L$ from the low power supply circuit and a high operating voltage $V_H$ from the high power supply circuit.

In one embodiment, the circuitry of the device 200 is incorporated into the circuitry of a battery powered external (i.e., non-implanted) device. Exemplary external devices include devices employed in communications (e.g., cellular phones), portable media devices (i.e., music and/or media players), personal digital assistants (PDA's), wireless network devices, and other external devices that periodically operate in low and high power modes. In such an external device, the high voltage circuit 206 may perform, for example, wired or wireless data communications, video display, audio signal amplification and other functions conventionally performed by high voltage circuits. Some of these exemplary functions are illustrated schematically in FIG. 2. The low voltage circuit 204, of such an external device, may perform various control functions, for example, as indicated by the controller(s) box in FIG. 2, or other functions conventionally performed by low voltage circuits.

In another embodiment, the circuitry of device 200 is incorporated into the circuitry of a battery powered, implantable medical device (IMD) that is configured for implantation in patient's body. In one embodiment, the IMD generally operates to deliver a therapy to the patient using the high voltage circuit 206. Exemplary functions performed by the high voltage circuit 206 to perform a therapy on the patient include, for example, nerve or muscle electrical stimulation (stimulating device), pump activation (pump), valve actuation (valve), drug delivery system activation (drug delivery system), as indicated in FIG. 2, and other conventional IMD functions. In one embodiment, said therapy may be initiated under the control of the low voltage circuit 204 (controller), either automatically in response to a sensed condition or signal (generated either internally or externally to the patient) that is monitored by the low voltage circuit 204 (i.e., signal monitoring), or at a particular time as controlled by the low voltage circuit 204, for example.

The terms "high" and "low" in the description of embodiments of the invention describe relative values of voltage, current or power. In one embodiment, the low voltage $V_L$ that is supplied to the low voltage circuit 204 is lower than $V_{BAT}$ supplied by the battery 202, and the high voltage $V_H$ that is supplied to the high voltage circuit 206 approximately equal to, or higher than $V_{BAT}$.

The voltage $V_L$ must generally be between minimum and maximum operating voltages for the low voltage circuit 204 to operate properly. The minimum operating voltage for the low voltage circuit 204 is generally dependent on the digital and/or analog circuit components of the low voltage circuit 204. For instance, the voltage $V_L$ must at least be the sum of the threshold voltage of an nMOS transistor plus the absolute value of the threshold voltage of a pMOS transistor used in a digital circuit portion of the low voltage circuit 204, and/or the minimum voltage required to operate components of an analog circuit portion of the low voltage circuitry 204. The minimum operating voltage for low voltage circuits of biomedical devices is typically 1.5 V. The maximum operating voltage for the low voltage circuit 204 also depends on the components of the circuit 204. For instance, the voltage $V_L$ needs to be less than the gate-to-source breakdown voltage of transistors (e.g., nMOS and pMOS transistors) used in the low voltage circuitry 204. This maximum operating voltage limit for $V_L$ is typically 5 V.

The voltage $V_H$ must also generally be between minimum and maximum operating voltages for the high voltage circuit 206 to operate properly. The minimum operating voltage is generally set based on the demands of the components of the circuit 206, such as that required by pumps, valves, electrical stimulation devices, drug delivery systems and other devices or components that are part of the high voltage circuit 206. The maximum operating voltage for $V_H$ is generally limited to the maximum permitted by the semiconductor fabrication process in which the integrated-circuits of the high voltage circuit 206 are made. In typical semiconductor fabrication processes used in the manufacture of integrated-circuits for biomedical devices, this upper limit is typically 20 V.

The battery voltage $V_{BAT}$ provided by the battery 202, must be set in accordance with the particular designs of the low voltage circuit 204 and the high voltage circuit 206, such that the minimum operating voltages for $V_L$ and $V_H$ can be provided. A typical range for $V_{BAT}$ is 2-5.5V.

The term "coupled to", as used herein, means the electrical coupling of components of the device 200 and is not intended to be limited to the direct coupling of the components via an electrical conductor without intermediate components. Rather, a component of the device 200 may be "coupled to" another component of the device 200 through electrical conductors and intermediate components.

In one embodiment, the high voltage circuit 206 receives $V_H$ from a high voltage power input 210 that is coupled to the high voltage circuit 206 and a step-up (boost) voltage converter 212. The step-up voltage converter 212 can be any suitable step-up converter, such as an inductive step-up converter or charge pump, for example. The step-up voltage converter 212 draws current from the battery 202 at an input 213 and generates the voltage $V_H$ at the output 214 that is fed to the high voltage power input 210. In one embodiment, the high voltage power input 210 comprises a high voltage holding capacitor $C_{HH}$, shown in FIG. 2, on which the high operating voltage $V_H$ is collected. Accordingly, the high power supply circuit of the device 200 generally includes the step-up voltage converter 212 and the high voltage power output 210, which uses the battery voltage $V_{BAT}$ to generate the voltage $V_H$ that powers the high voltage circuit 206.

The device 200 may include one or more controllers to control the operation of, for example, the step-up voltage converter 212, the low voltage circuit 204, the high voltage circuit 206 and other components of the device 200. In order to simplify the drawings and the discussion of the invention, controllers used in the device 200 will be represented schematically by the controller 215. Thus, the various functions described herein as being performed by the controller 215 in accordance with embodiments of the invention, may be performed by a single controller or multiple controllers. Accordingly, the depicted controller can represent one or more microcontrollers, analog circuits, digital circuits and other control electronics. In one embodiment, the controller 215 is a component of the low voltage circuit 204, as indicated in FIG. 2.

In one embodiment, the controller 215 provides one or more control signals 217 to the step-up voltage converter 212 to control the generation of $V_H$ by the step-up voltage converter 212, in accordance with conventional methods.

In one embodiment, the low voltage circuit 204 is coupled to the battery voltage $V_{BAT}$. In one embodiment, the low voltage circuit 204 receives $V_L$ from a low voltage power input 216 that is coupled to the low voltage circuit 204 and the battery 202, as shown in FIG. 2. One embodiment of the low voltage power input 216 comprises a low voltage holding capacitor $C_{HL}$, shown in FIG. 2, on which the voltage $V_L$ is collected.

In one embodiment, the battery voltage $V_{BAT}$ is coupled to the low voltage power input 216 through a conductive path 218. In one embodiment, the conductive path 218 includes a diode 219, such as a Schottky diode, or other suitable arrangement that prevents the backflow of current to the battery 202. The diode 219 has an anode side 220 coupled to the battery voltage $V_{BAT}$ and a cathode side 221 coupled to the low voltage circuit 204.

When the low voltage circuit 204 is powered from the battery voltage $V_{BAT}$, the voltage $V_L$ equals $V_{BAT}$ less the forward voltage drop across the diode 219 (typically 0.5 V). The low voltage circuit 204 can operate properly as long as $V_L$ exceeds the minimum voltage ($V_{min}$) required by the low voltage circuit 204 to operate properly.

However, as mentioned above, when the step-up voltage converter 212 is activated to supply power to the high voltage circuit 206, such as through the charging of the high voltage holding capacitor $C_{HH}$, the current drawn from the battery 202 will cause a drop in $V_{BAT}$ due to the internal resistance $R_{BAT}$. This can cause $V_L$ to drop below the minimum voltage $V_{min}$ required by the low voltage circuit 204, which can cause the low voltage circuit 204 to malfunction.

In one embodiment, the controller 215 selectively powers the low voltage circuit 204 and the low voltage power input 216 using either the output 214 from the step-up voltage converter 212 or the battery voltage $V_{BAT}$. This means that the controller 215 allows for current to be delivered either from the output 214 of the step-up voltage converter 212 to the low voltage circuit 204, or from the battery 202 to the low voltage circuit 204 without going through the step-up voltage converter 212, such as along the conductive path 218. As a result, as used herein, the controller 215 powers the low voltage circuit 204 using the battery voltage $V_{BAT}$ when the current is delivered to the low voltage circuit 204 without going through the step-up voltage converter 212, even though the voltage $V_H$ at the output 214 is generated using the battery voltage $V_{BAT}$.

One embodiment of the device 200 includes a voltage regulator 230. The voltage regulator 230 comprises an input 232 that is coupled to the output 214 of the step-up voltage converter 212 and/or the high voltage power output 210, and an output 234 that is coupled to the low voltage circuit 204 as shown in FIG. 2. The voltage regulator 230 is configured to produce a low supply voltage $V_{REG}$ at the output 234 in response to the voltage $V_H$ at the output 214 of the step-up voltage converter 212. In one embodiment, a diode 235 (e.g., Schottky diode), or other suitable electronics, is coupled to the output 234 to prevent the backflow of current through the voltage regulator. The anode side 237 is coupled to the output and the cathode side 239 is coupled to the low voltage circuit 204. In one embodiment, the voltage regulator 230 is selectively activated to produce $V_{REG}$ and deactivated to prevent the production of $V_{REG}$ in response to control signals 236 from the controller 215.

In one embodiment, the low voltage holding capacitor $C_{HL}$ and, thus, the low voltage circuit 204, is powered by the battery voltage $V_{BAT}$ when $V_{BAT}$ less the forward voltage drop across the diode 219 exceeds the voltage $V_{REG}$ less the forward voltage drop across the diode 235. In this case, the voltage $V_L$ is equal to $V_{BAT}$ less the forward voltage drop across the diode 219. The low voltage holding capacitor $C_{HL}$ is powered by the voltage $V_{REG}$ and, thus, the voltage $V_H$, when $V_{BAT}$ less the forward voltage drop across the diode 219 falls below the voltage $V_{REG}$ less the forward voltage drop across the diode 235. In this case, the voltage $V_L$ is equal to $V_{REG}$ less the forward voltage drop across the diode 235. As a result, the low voltage holding capacitor $C_{HL}$ is either powered by the battery voltage $V_{BAT}$ or the voltage $V_H$ depending on whether the voltage $V_{BAT}$ exceeds or falls below a threshold voltage equal to $V_{REG}$ plus the forward voltage drop across the diode 219 and less the forward voltage drop across the diode 235. The value of $V_{REG}$ is preferably selected such that $V_{REG}$ less the forward voltage drop across the diode 235 exceeds the minimum voltage $V_{min}$ required by the low voltage circuit to operate properly.

Accordingly, embodiments of the low power supply circuit generally include the conductive path 218, the low voltage power input 216, the controller 215, the output 214 of the step-up voltage converter 212 and the voltage regulator 230.

Figure 3:
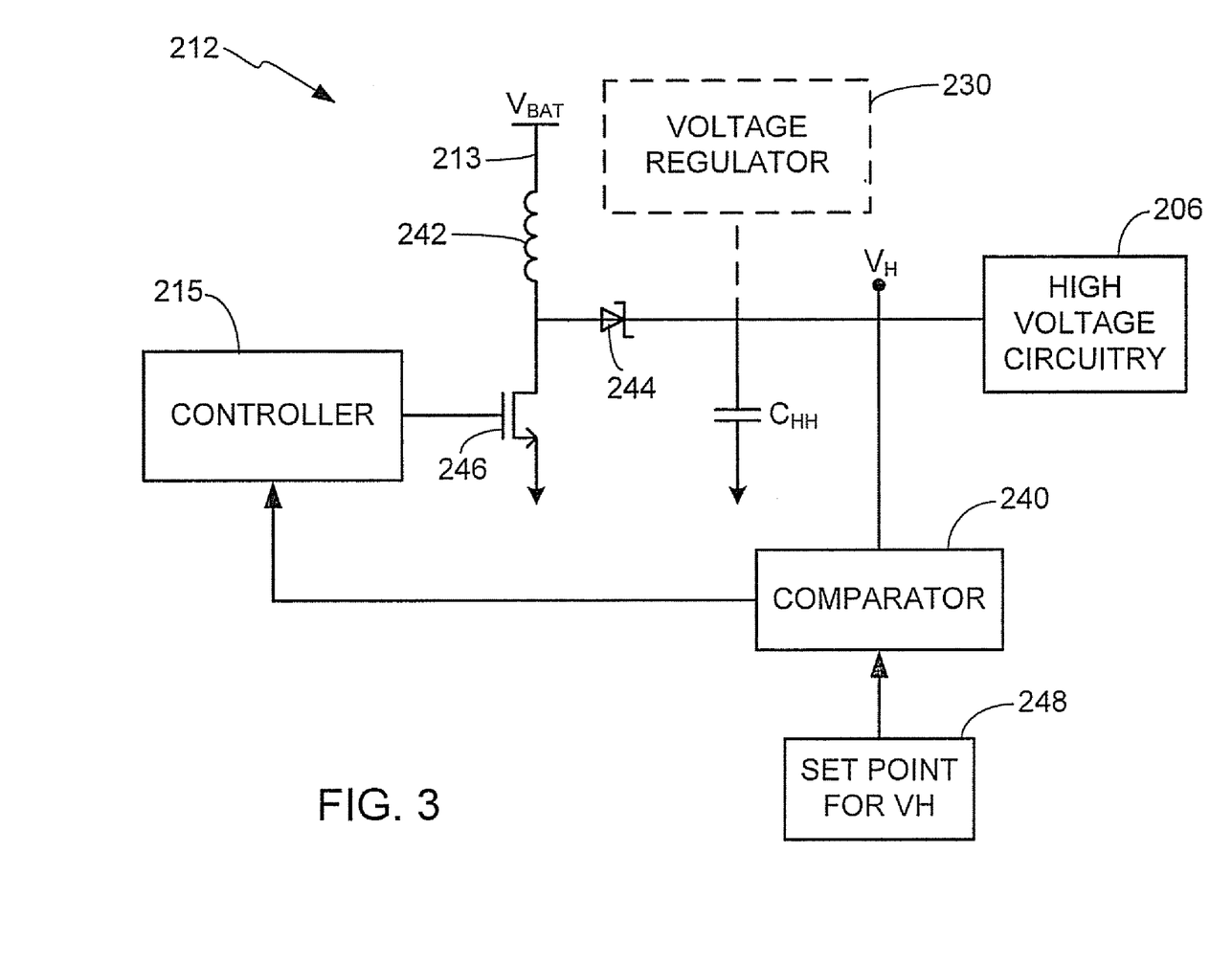
FIG. 3 is a schematic circuit diagram of an exemplary step-up voltage converter useable in the practice of the invention.

The step-up voltage converter 212 can be any suitable step-up voltage converter or charge pump that is configured to perform the conversion of $V_{BAT}$ to $V_H$. FIG. 3 is a schematic circuit diagram of an exemplary inductive step-up voltage converter 212 that performs the desired conversion. One embodiment of the step-up voltage converter 212 includes a controller 215, a comparator 240, an inductor 242, a diode 244 (e.g., Schottky diode), and an nMOS transistor 246. The controller 215 represents the control circuitry required to control the nMOS transistor 246 to produce the desired charging of the high voltage holding capacitor $C_{HH}$. Thus, the controller 215 represents the digital logic circuits, microcontroller and/or other circuitry required to control the step-up voltage converter 212 and produce the voltage $V_H$.

The input 213 of the step-up voltage converter 212 is coupled to the battery voltage $V_{BAT}$. During charging of the high voltage holding capacitor $C_{HH}$, the controller 215 switches the nMOS transistor 246 on and off. When the nMOS transistor 246 is switched off, current from the battery 202 initially flows through the inductor 242 and the diode 244, and charges the high voltage holding capacitor $C_{HH}$. When the transistor 246 is switched on, the current from the battery 202 flows through the transistor 246 to ground and the high voltage holding capacitor $C_{HH}$ is not charged. As a result, the switching of the transistor 246 on and off causes a train of current pulses to be delivered to the high voltage holding capacitor $C_{HH}$ through the diode 244 to thereby charge the high voltage holding capacitor $C_{HH}$.

The comparator 240 compares the voltage $V_H$ of the high voltage holding capacitor $C_{HH}$ to a set point 248 for the voltage $V_H$. The set point 248 represents the target voltage for $V_H$. The comparator 240 provides a signal to the controller 215 that indicates whether the voltage $V_H$ has reached the desired target voltage. The charging of the high voltage holding capacitor $C_{HH}$ continues until the voltage $V_H$ reaches the desired target voltage. The voltage $V_H$ can then be used to drive the high voltage circuit 206.

Figure 4:
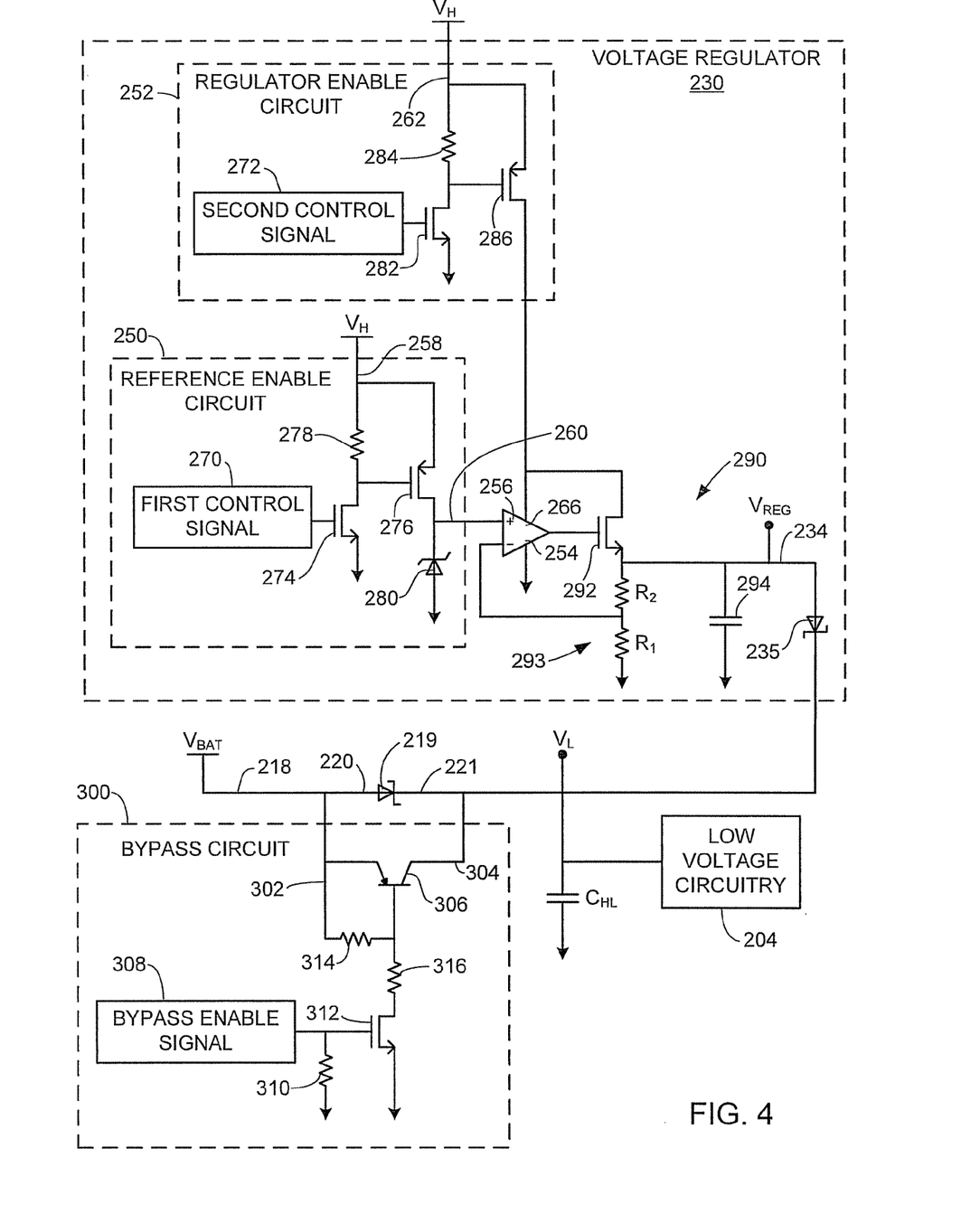
FIG. 4 is a schematic circuit diagram illustrating an exemplary voltage regulator and an exemplary bypass circuit in accordance with embodiments of the invention.

FIG. 4 is a schematic circuit diagram of an exemplary embodiment of the voltage regulator 230 that comprises a reference enable circuit 250, a regulator enable circuit 252 and an operational amplifier 254. The reference enable circuit 250 generally operates to provide a reference voltage to the non-inverting or reference voltage input 256 of the op-amp 254. The regulator enable circuit 252 generally operates to supply power to the op-amp 254. In one embodiment, the voltage regulator 230 becomes activated and produces the voltage $V_{REG}$ at the output 234 only when both the reference enable circuit 250 and the regulator enable circuit 252 are activated In one embodiment, the reference enable circuit 250 includes an input 258 that is coupled to the high voltage holding capacitor $C_{HH}$ or the output 214 of the step-up voltage converter 212. The reference enable circuit 250 has an activated state, in which a high reference voltage is supplied to the reference voltage input 256 through a reference voltage output 260. The reference enable circuit 250 also has a deactivated state, in which a low reference voltage is supplied to the reference voltage input 256 through the reference voltage output 260.

The regulator enable circuit 252 includes an input 262 coupled to the high voltage holding capacitor $C_{HH}$ and a power output 264 coupled to a power input 266 of the op-amp 254. The regulator enable circuit 252 has an activated state, in which the voltage $V_H$ is supplied to the power input 266 to power the op-amp 254. The regulator enable circuit also has a deactivated state, in which the voltage $V_H$ is not supplied to the power input 266 and the op-amp becomes disabled.

In one embodiment, the controller 215 provides first and second control signals 270 and 272 which are respectively coupled to control signal inputs of the reference enable circuit 250 and the regulator enable circuit 252. In one embodiment, the first and second control signals 270 and 272 each comprise enabling and disabling states. In accordance with one embodiment, the reference enable circuit 250 becomes activated when the first control signal 270 is in the enabling state, and the reference enable circuit 250 becomes deactivated when the first control signal 270 is in the disabling state. Similarly, the regulator enable circuit becomes activated when the second control signal 272 is in the enabling state, and the regulator enable circuit 252 becomes deactivated when the second control signal 272 is in the disabling state. As a result, the voltage regulator 230 is activated only when the first control signal 270 and the second control signal 272 are in their enabling states.

In one embodiment of the reference enable circuit 250, the first control signal 270 is applied to the gate of an nMOS transistor 274. When the first control signal 270 is LOW (i.e., disabling), the transistor 274 is off. As a result, the voltage at the gate of the pMOS transistor 276, which is coupled to the voltage $V_H$ through a resistor 278 is pulled to the voltage $V_H$. As a result, the pMOS transistor 276 is off and current is prevented from flowing through the reverse-biased zener diode 280, and the reference voltage output 260 is essentially at zero volts. When the first control signal 270 is high (i.e. enabling), the nMOS transistor 274 is turned on allowing current to flow through the transistor 274 from the input 258 and through the resistor 278. As a result, the voltage at the gate of the transistor 276 is pulled LOW and current is allowed to flow from the input 258 through the zener diode 280. As a result, the voltage at the reference voltage output 260 will be that of the voltage across the diode 280, which is the desired reference voltage supplied to the reference voltage input 256 of the op-amp 254.

In one embodiment, the second control signal 272 supplied to the control signal input of the regulator enable circuit 252 is provided to the gate of an nMOS transistor 282. When the second control signal 272 is LOW (i.e., disabling), the transistor 282 is off and current is prevented from flowing from the input 262 through the resistor 284 and through the transistor 282. As a result, the voltage at the gate of the pMOS transistor 286 is HIGH (essentially $V_H$) thereby preventing current from flowing through the transistor 286. Thus, when the second control signal 272 is in the disabling state, power is not supplied to the input 266 of the op-amp 254 thereby preventing its operation. When the second control signal 272 is HIGH (i.e., enabling), current is allowed to flow through the transistor 282 and the voltage at the gate of the transistor 286 is pulled LOW. As a result, current is allowed to flow from the input 262 through the transistor 286 to supply power to the power input 266 of the op-amp 254.

One embodiment of the voltage regulator 230 includes an output circuit 290 that produces the voltage $V_{REG}$ when the voltage regulator is activated. The output circuit 290 generally comprises the op-amp 254, an nMOS pass transistor 292, a voltage divider 293 comprising resistors $R_1$ and $R_2$, and a capacitor 294. When the output circuit 290 is activated due to, for example, enabling first and second control signals 270 and 272, the input to the inverting input of the op-amp 254 receives the voltage between the resistors $R_1$ and $R_2$ of the voltage divider which is relatively low compared to the voltage at the reference voltage input 256. As a result, the input to the gate of the transistor 292 is HIGH, which allows the current supplied by the regulator enable circuit 252 to pass through the transistor 292, through the voltage divider 293. The resultant voltage $V_{REG}$ provided at the output 234 of the voltage regulator 230 is equal to $1.2(1+R_2/R_1)$. $V_{REG}$ can then be used to power the low voltage holding capacitor $C_{HL}$ and power the low voltage circuit 204 under certain conditions, as discussed above.

One embodiment of the device 200 includes a bypass circuit 300 illustrated in FIGS. 2 and 4. The bypass circuit 300 generally operates to reduce voltage losses due to the forward voltage drop across the diode 219 when the low voltage circuit 204 is powered by the battery voltage $V_{BAT}$ and when the voltage regulator 230 is not active. In general, the bypass circuit 300 comprises an input 302 that is coupled to the anode side 220 of the diode 219 and an output 304 that is coupled to the cathode side 221 of the diode 219. The bypass circuit 300 includes an activated state, in which current from the battery 202 is allowed to bypass the diode 219 by traveling through the input 302 and along a conductive path to the output 304, from which it can travel to the low voltage circuit 204. When the bypass circuit 300 is deactivated, current is prevented from flowing between the input 302 to the output 304 and, thus, the current delivered from the battery 202 is forced to travel through the diode 219.

In one embodiment, the controller 215 is configured to provide a bypass enable signal 308 to the bypass circuit 300, which is fed to a resistor 310 and the gate of an nMOS transistor 312. When the bypass enable signal is LOW (i.e., disabling), the input to the gate of the transistor 312 is LOW and current from the input 302 is prevented from traveling through the transistor 312. As a result, the transistor 306 prevents the flow of current from the input 302 to the output 304 and the bypass circuit 300 is deactivated. However, when the bypass enable signal 308 is HIGH (i.e., enabling), the voltage at the gate of the transistor 312 is HIGH and current is allowed to travel through the transistor 312 from the input 302. Resistors 314 and 316 are set to ensure that a very small amount of current passes through the transistor 312. As the current flows through the resistors 314 and 316 from the input 302, the transistor 306 allows current to travel from the input 302 to the output 304, thereby bypassing the diode 219 and placing the bypass circuit 300 in its activated state.

As mentioned above, it is preferable that the bypass circuit 300 is activated when the voltage regulator 230 is deactivated, and the bypass circuit 300 is preferably deactivated when the voltage regulator 230 is activated. This ensures that when current is delivered to the low voltage power input 216 from the activated voltage regulator, the current will be prevented from flowing to the battery 202 through the bypass circuit 300. In another embodiment, the bypass circuit 300 is activated when the step-up voltage converter 212 is deactivated by the controller 215, and the bypass circuit 300 is preferably deactivated when the step-up voltage converter is activated.

Figure 5:
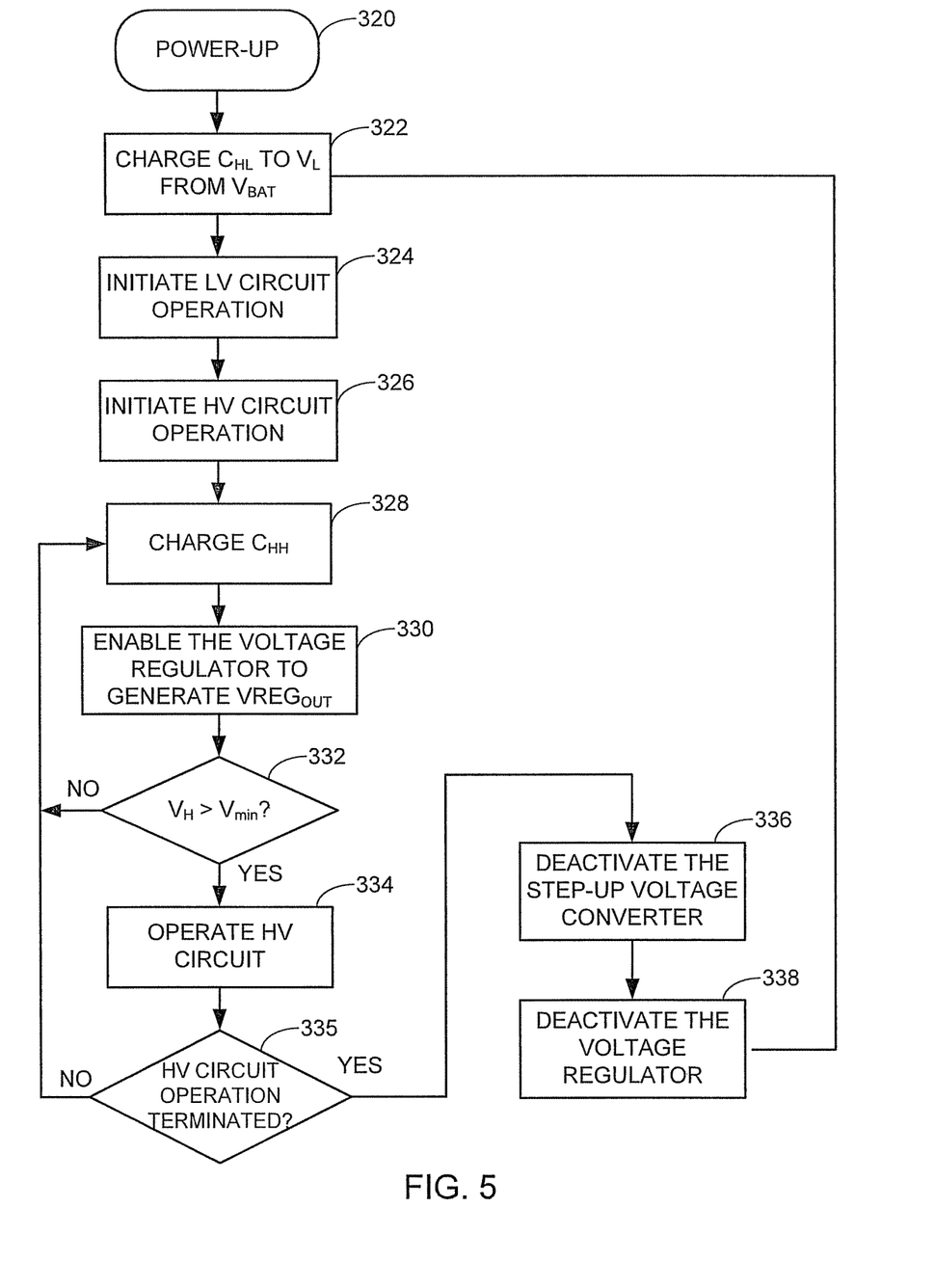
FIG. 5 is a flowchart illustrating exemplary operations of the battery powered device in accordance with embodiments of the invention.

A discussion of the operation of the device 200 in accordance with embodiments of the invention will be discussed with reference to the flowchart of FIG. 5 and the signal timing diagram of FIG. 6. At step 320, the device 200 undergoes an initial power-up, which may occur at the completion of manufacture or the insertion of the charged battery 202 in the device 200. At step 322, the low voltage holding capacitor $C_{HL}$ is charged to the voltage $V_L$ using the battery voltage $V_{BAT}$ generally over the period $t_1$-$t_2$. The voltage $V_L$ provides power to the low voltage circuit 204 during all of the steps of FIG. 5. Initially, the voltage $V_L$ is equal to $V_{BAT}$ less the forward voltage drop (typically 0.5 volts) of the diode 219 (FIGS. 2 and 4). Once the voltage $V_L$ exceeds the minimum operating voltage of the low voltage circuit 204, the controller 215 can initiate operation of the low voltage circuit 204, as indicated at step 324.

In one embodiment, before the controller 215 initiates a high voltage operation ($t_1$-$t_2$) using the high voltage circuit 206, the bypass enable signal 308 is set to HIGH in order to activate the bypass circuit 300 and allow the current from the battery 202 to bypass the diode 219. Because the controller 215 has not triggered a high voltage operation, the step-up converter 212 is initially deactivated and the voltage $V_H$ generally remains below the minimum operating voltage $V_{min}$ required to operate the high voltage circuit 206. Additionally, the voltage regulator 230 is deactivated. In one embodiment, the first and second control signals 270 and 272 are set to their disabling state by the controller 215.

Figure 6:
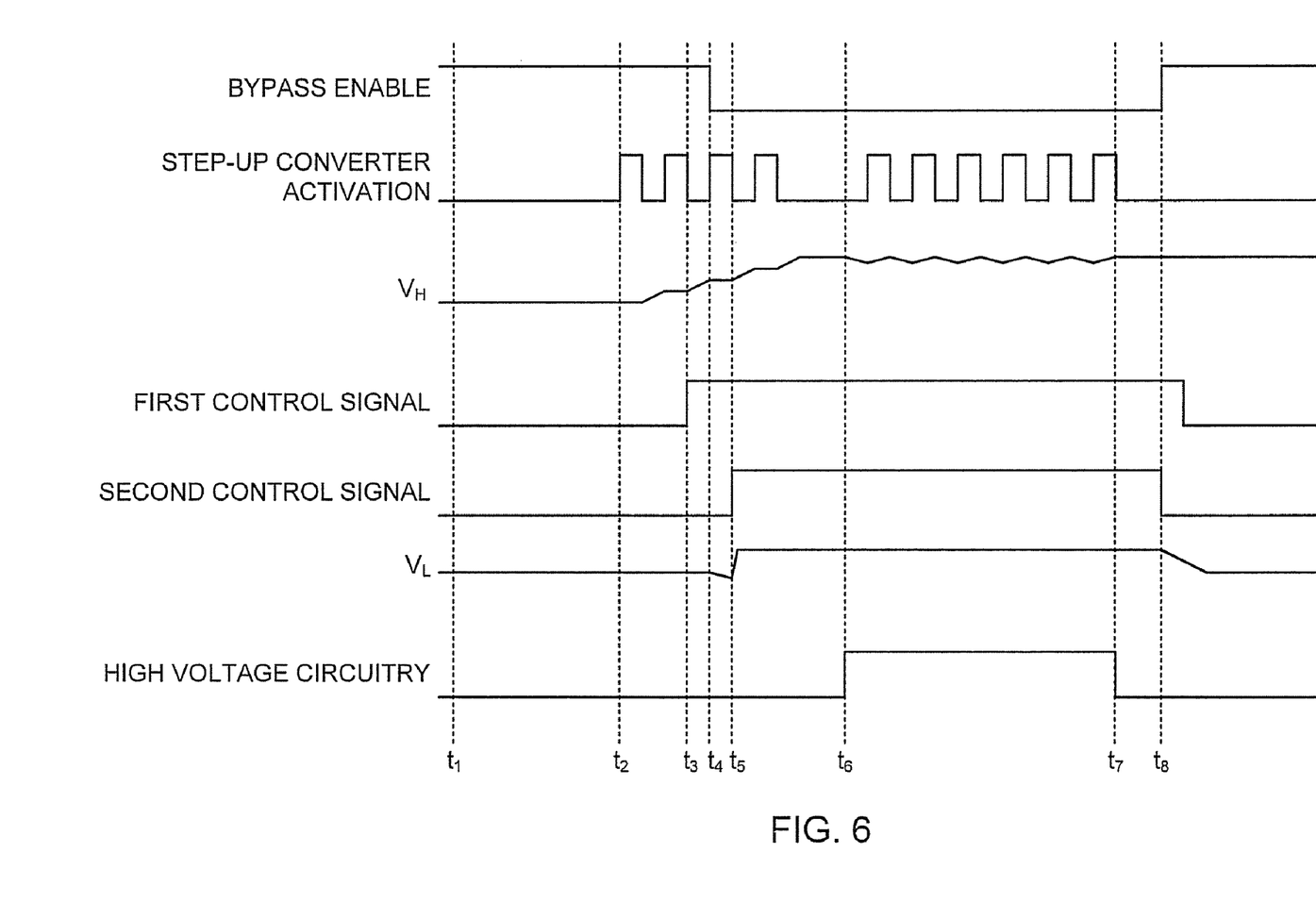
FIG. 6 is a signal timing diagram illustrating an exemplary operation of the battery powered device in accordance with embodiments of the invention.

At step 326, the controller 215 initiates a high voltage operation that is to be conducted by the high voltage circuit 206 by activating the step-up converter 212, as indicated at time $t_2$ in FIG. 6. The activation of the step-up voltage converter 212 begins the charging of the high voltage holding capacitor $C_{HH}$ to raise the voltage $V_H$ to the minimum operating voltage $V_{min}$ required to operate the high voltage circuit 206, as indicated at step 328.

In accordance with one embodiment, during the charging of the high voltage holding capacitor $C_{HH}$, the controller 215 activates the voltage regulator 230 (step 330) at time $t_5$ to begin producing the low supply voltage $V_{REG}$ at the output 234. In one embodiment, the controller 215 activates the voltage regulator 230 through the activation of the first and second control signals 270 and 272. In one embodiment, the first control signal 270 is set to the enabling state (e.g., HIGH) at time $t_3$ in order to activate the reference enable circuit 250 and generate the high reference voltage at the output 260. In one embodiment, the second control signal 272 is set to the enabling state (e.g., HIGH) at time $t_5$ to enable the regulator enable circuit 252 and supply power to the power input 266 of the op-amp 254. In accordance with one embodiment, the time difference between $t_3$ and $t_5$ is sufficient to ensure that the high reference voltage produced at the output 260 of the reference enable circuit 250 has become sufficiently stable to ensure proper operation of the voltage regulator 230.

As the voltage $V_H$ increases during the activation of the step-up converter 212, the voltage $V_H$ on the high voltage holding capacitor $C_{HH}$ is periodically checked, in accordance with conventional methods, to determine whether the voltage $V_H$ exceeds the minimum operating voltage $V_{min}$ required by the high voltage circuit 206 to operate properly, as indicated at step 332. If the voltage $V_H$ does not exceed the minimum operating voltage $V_{min}$ for the high voltage circuit 206, the method returns to step 328 and the step-up converter 212 remains activated to continue charging the high voltage holding capacitor $C_{HH}$.

As mentioned above, in the event that the battery voltage $V_{BAT}$ less the forward voltage drop across the diode 219 drops below the voltage $V_{REG}$ produced by the voltage regulator 230 less the forward voltage drop across the diode 235, such as at time $t_5$, the low supply voltage $V_{REG}$ produced by the voltage regulator 230 is used to charge the low voltage holding capacitor $C_{HL}$ and provide power to the low voltage circuit 204. This results in the maintaining of the voltage $V_L$ above the minimum operating voltage $V_{min}$ required by the low voltage circuit 204.

In one embodiment, the bypass enable signal 308 is set to the disabling state prior to the activation of the voltage regulator 230, such as at time $t_4$. This ensures that the current will be prevented from flowing back to the battery 202 in the event that the charge $V_L$ exceeds the battery voltage $V_{BAT}$ less the forward voltage drop across the diode 219.

Steps 328 and 332 are performed repeatedly until the charge $V_H$ on the high voltage holding capacitor $C_{HH}$ exceeds the minimum operating voltage $V_{min}$ required to operate the high voltage circuit 206. Once the voltage $V_H$ exceeds the required minimum operating voltage $V_{min}$, the controller 215 operates the high voltage circuit 206 to perform the high voltage operation at time $t_6$, as indicated at step 334. At step 335, a determination can be made as to whether the high voltage operation has been terminated. If the high voltage operation has not been terminated, the method returns to step 338 to continue charging the high voltage holding capacitor $C_{HH}$. Upon termination of the high voltage operation at time $t_7$, the controller 215 deactivates the step-up converter 212, as indicated at step 336.

At step 338, the controller 215 deactivates the voltage regulator 230 at time $t_8$. In one embodiment, the second control signal 272 is set to the disabling state at time $t_8$ and the first control signal 270 is set to the disabling state at time $t_9$, which is a predetermined period of time following the disabling of the second control signal 272. Finally, after the voltage regulator 230 has been deactivated, the controller 215 transitions the bypass enable signal 308 from the disabling state to the enabling state at time $t_8$ to thereby allow current from the battery 202 to bypass the diode 219.

Although the present invention has been described with reference to preferred embodiments, workers skilled in the art will recognize that changes may be made in form and detail without departing from the spirit and scope of the invention.

What is claimed is:
1. A device comprising:
a battery having an output of a battery voltage;
a step-up voltage converter having an input coupled to the battery voltage and configured to produce a high supply voltage at an output;
a high voltage circuit coupled to the output of the step-up voltage converter;
a low voltage circuit;
a voltage regulator having an input coupled to the output of the step-up voltage converter, the voltage regulator having an activated state, in which a low supply voltage is produced at an output of the voltage regulator that is coupled to the low voltage circuit, and a deactivated state, in which the low supply voltage is not produced at the output of the voltage regulator;

a first diode including an anode side coupled to the battery voltage and a cathode side coupled to the low voltage circuit;

a bypass circuit having an input coupled to the anode side of the first diode and an output coupled to the cathode side of the first diode, wherein power is delivered to the low voltage circuit through the bypass circuit when the bypass circuit is activated and power is blocked from being delivered to the low voltage circuit through the bypass circuit when the bypass circuit is deactivated; and a controller selectively couples the low voltage circuit to one of the output from the step-up voltage converter and the battery voltage, deactivates the bypass circuit when the voltage regulator is activated and activates the bypass circuit when the voltage regulator is deactivated.

2. The device of claim 1, wherein:

the device further comprises a low voltage holding capacitor configured to supply power to the low voltage circuit; and the controller selectively couples the low voltage holding capacitor to one of the output from the step-up voltage converter and the battery voltage.

3. The device of claim 1, further comprising a second diode having an anode side coupled to the output of the voltage regulator and a cathode side coupled to the low voltage circuit.

4. The device of claim 1, wherein:

the voltage regulator comprises:

an operational amplifier having a reference voltage input and a power input;

a reference enable circuit comprising an input coupled to a high voltage holding capacitor and a reference voltage output coupled to the reference voltage input, the reference enable circuit having an activated state, in which a high reference voltage is supplied to the reference voltage input through the reference voltage output, and a deactivated state, in which a low reference voltage is supplied to the reference voltage input through the reference voltage output; and a regulator enable circuit comprising an input coupled to the high voltage holding capacitor and a power output coupled to the power input of the operational amplifier, the regulator enable circuit having an activated state, in which a high voltage is supplied to the power input, and a deactivated state, in which a low voltage is supplied to the power input; and the voltage regulator produces the low supply voltage when both the reference enable circuit and the regulator enable circuit are activated.

5. The device of claim 4, wherein:

the controller comprises a first control signal output coupled to a control signal input of the reference enable circuit and a second control signal coupled to a control signal input of the regulator enable circuit;

the reference enable circuit is set in one of the activated and deactivated states responsive to the first control signal output; and the regulator enable circuit is set in one of the activated and deactivated states responsive to the second control signal output.

6. The device of claim 1, wherein:

the device is an implantable medical device; and the high voltage circuitry comprises a component selected from the group consisting of an electrical stimulator circuit, a pump and a valve.

7. A device comprising:

a battery having an output of a battery voltage;

a high voltage circuit powered by a high voltage holding capacitor;

a step-up voltage converter having an input coupled to the battery voltage, the step-up voltage converter having an activated state, in which the step-up voltage converter charges the high voltage holding capacitor;

a low voltage holding capacitor powered by the battery voltage when the battery voltage exceeds a threshold value, the low voltage holding capacitor powered by the voltage on the high voltage holding capacitor when the battery voltage drops below the threshold value during charging of the high voltage holding capacitor by the step-up voltage converter; and a low voltage circuit powered by the low voltage holding capacitor.

8. The device of claim 7, wherein:

the step-up voltage converter is configured to produce a high supply voltage at an output, which is coupled to the high voltage holding capacitor; and the device further comprises a voltage regulator having an input coupled to the output of the step-up voltage converter, the voltage regulator configured to produce a low supply voltage at an output that is coupled to the low voltage holding capacitor.

9. The device of claim 8, wherein:

the voltage regulator comprises first and second control signal inputs;

the device further comprises a controller having a first control signal output coupled to the first control signal input and a second control signal coupled to the second control signal input, the first and second control signal outputs each comprising an enabling state and a disabling state; and the voltage regular produces the low supply voltage at the output when the first control signal is in the enabling state and the second control signal is in the enabling state.

10. The device of claim 9, wherein the controller changes the state of the second control signal output from the disabling state to the enabling state after a predetermined period of time following the change in the state of the first control signal output from the disabling state to the enabling state.

11. The device of claim 8, wherein:

the voltage regulator comprises:

an operational amplifier having a reference voltage input and a power input;

a reference enable circuit comprising an input coupled to the high voltage holding capacitor and a reference voltage output coupled to the reference voltage input, the reference enable circuit having an activated state, in which a high reference voltage is supplied to the reference voltage input through the reference voltage output, and a deactivated state, in which a low reference voltage is supplied to the voltage reference input through the reference voltage output; and a regulator enable circuit comprising an input coupled to the high voltage holding capacitor and a power output coupled to the power input of the operational amplifier, the regulator enable circuit having an activated state, in which a high voltage is supplied to the power input, and a deactivated state, in which a low voltage is supplied to the power input; and the voltage regulator produces the low supply voltage when both the reference enable circuit and the regulator enable circuit are activated.

12. The device of claim 11, wherein:
the controller comprises a first control signal output coupled to a control signal input of the reference enable circuit and a second control signal coupled to a control signal input of the regulator enable circuit;
the reference enable circuit is set in one of the activated and deactivated states responsive to the first control signal output; and
the regulator enable circuit is set in one of the activated and deactivated states responsive to the second control signal output.

13. The device of claim 12, wherein:
the first control signal output comprises an enabling state and a disabling state respectively activating and deactivating the reference enable circuit;
the second control signal output comprises an enabling state and a disabling state respectively activating and deactivating the regulator enable circuit; and
the controller changes the state of the second control signal input from the disabling state to the enabling state after a predetermined period of time following the change in the state of the first control signal from the disabling state to the enabling state.

14. The device of claim 8, further comprising a diode having an anode side coupled to the output of the voltage regulator and an cathode side coupled to the low voltage holding capacitor.

15. The device of claim 7, further comprising:
a diode including an anode side coupled to the battery voltage and a cathode side coupled to the low voltage holding capacitor; and
a bypass circuit having an input coupled to the anode side of the diode and an output coupled to the cathode side of the diode;
wherein:
the bypass circuit is activated when the step-up voltage converter is not in the activated state;
the bypass circuit is deactivated when the step-up voltage converter is in the activated state;
power is delivered to the low voltage circuit through the bypass circuit when the bypass circuit is activated; and
power is blocked from being delivered to the low voltage circuit through the bypass circuit when the bypass circuit is deactivated.

16. The device of claim 7, wherein:
the device is an implantable medical device; and
the high voltage circuitry comprises a component selected from the group consisting of an electrical stimulator circuit, a pump and a valve.

17. A method of operating a device powered by a battery, which produces a battery voltage, the device comprising a low voltage circuit powered by a low voltage holding capacitor, a high voltage circuit powered by a high voltage holding capacitor and a step-up voltage converter, the method comprising:
charging the high voltage holding capacitor using the battery voltage and the step-up voltage converter;
charging the low voltage holding capacitor using the battery voltage when the battery voltage exceeds a threshold value; and
charging the low voltage holding capacitor using the voltage on the high voltage holding capacitor when the battery voltage falls below the threshold value.

18. The method of claim 17, wherein charging the low voltage holding capacitor using the battery voltage when the battery voltage exceeds a threshold value comprises selectively delivering current from the battery to the low voltage holding capacitor through one of:
a diode having an anode side coupled to the battery voltage and a cathode side coupled to the low voltage holding capacitor; and
a conductive path that bypasses the diode.

* * * * *